(12) United States Patent
Laricchiuta (10) Patent No.: US 7,942,045 B1
(45) Date of Patent: May 17, 2011

(54) ENGINE PULLEY TESTING DEVICE

(76) Inventor: Lawrence Andrew Laricchiuta, Farmingville, NY (US)

( * ) Notice: Subject to any disclaimer, the term of this patent is extended or adjusted under 35 U.S.C. 154(b) by 18 days.

(21) Appl. No.: 12/544,883

(22) Filed: Aug. 20, 2009

(51) Int. Cl.
*G01M 15/00* (2006.01)

(52) U.S. Cl. .................................................. 73/114.77

(58) Field of Classification Search ............... 73/114.77
See application file for complete search history.

(56) References Cited

U.S. PATENT DOCUMENTS

| | | |
|---|---|---|
| 3,832,899 A | 9/1974 | Nicolau |
| 4,235,091 A | 11/1980 | Takano et al. |
| 4,480,487 A | 11/1984 | Kunzfeld |
| D319,987 S | 9/1991 | Ueno |
| 5,320,581 A * | 6/1994 | Avery .......................... 474/101 |
| 5,336,993 A | 8/1994 | Thomas et al. |
| 5,701,089 A | 12/1997 | Perkins |
| 5,752,891 A * | 5/1998 | Meckstroth et al. .......... 474/110 |
| 5,780,731 A | 7/1998 | Matsui et al. |
| 6,301,978 B1 | 10/2001 | Sargent |
| 7,246,015 B2 | 7/2007 | Bertness et al. |

* cited by examiner

*Primary Examiner* — Freddie Kirkland, III (57) ABSTRACT

An engine pulley testing device comprising a first support arm pivotally connected to a second support arm; an arc-shaped brace component with a slot disposed therein, wherein the brace component is slidably attached to the back of the first support arm and the back of the second support arm, wherein the brace component can be locked to the first support arm and to the second support arm via a third locking means; a third support arm attached to the support brace and extending upwardly past the pivot component; a pulley pole perpendicularly attached to the third support arm; and a top pulley attached to the pulley pole, a first bottom pulley rotatably attached to the first support arm, and a second bottom pulley rotatably attached to the second support arm; wherein an engine belt can be wrapped around the pulleys and the test pulley being tested in the engine.

9 Claims, 7 Drawing Sheets

ENGINE PULLEY TESTING DEVICE

FIELD OF THE INVENTION

The present invention is directed to a diagnostic device for automobiles. More particularly, the present invention is directed to a device for detecting worn engine pulleys.

BACKGROUND OF THE INVENTION

Various engine parts include one or more pulleys, all of which are driven by a single belt. With time, the pulleys can begin rattling or squeaking, which can indicate the pulley is deteriorating. However, because a single belt operates all the pulleys, it is difficult to determine which pulley is deteriorating.

The present invention features an engine pulley testing device for allowing a user to detect a damaged engine pulley. The engine pulley testing device comprises a first support arm pivotally connected to a second support arm, a third support arm attached to the first and second support arms via a brace component, and three pulleys. An engine belt can be wrapped around the pulleys.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIGS. 1-6, the present invention features an engine pulley testing device 100 for allowing a user to detect a damaged engine pulley. The engine pulley testing device 100 comprises a first support arm and a second support arm. The first support arm and second support arm both have a first end and a second end. The first end of the first support arm is pivotally attached to the first end of the support arm.

In some embodiments, the first support arm has a first inner post 120 telescopically received in a first outer post 110. The first inner post 120 has a first end 121 and a second end 122, and the first outer post 110 has a first end 111 and a second end 112. In some embodiments, the second support arm has a second inner post 220 telescopically received in a second outer post 210. The second inner post 220 has a first end 221 and a second and 222, and the second outer post 210 has a first end 211 and a second end 212.

The length of the first support arm is adjustable by moving the first inner post 120 in and out of the first outer post 110. Telescopic mechanisms of this nature are well known to one of ordinary skill in the art. In some embodiments, the length of the first support arm is measured from the first end 111 of the first outer post 110 to the second end 122 of the first inner post 120. The length of the first support arm can be locked via a first locking mechanism, for example the first outer post 110 can be secured to the first inner post 120. In some embodiments, the first locking mechanism is a tightening mechanism (e.g., tightening with a lock nut and screw). For example, in some embodiments, a first screw is disposed on the front surface 123 of the first inner post 120 and extends forwardly through a first slot 116 disposed on the front surface 113 of the first outer post 110. As the first inner post 120 slides in and out of the first outer post 110, the first screw slides up and down within the first slot 116. A first lock nut 128 may be attached to the first screw (external to the first outer post 110). When the first inner post 120 is in a position of the user's choosing, he/she can turn the first lock nut 128 to tighten the connection between the first inner post 120 and the first outer post 110. Such mechanisms are well known to one of ordinary skill in the art.

The length of the second support arm is adjustable by moving the second inner post 220 in and out of the second outer post 210. In some embodiments, the length of the second support arm is measured from the first end 121 of the second outer post 210 to the second end 122 of the second inner post 220. The length of the second support arm can be locked via a second locking mechanism, for example the second outer post 210 can be secured to the second inner post 220. In some embodiments, the second locking mechanism is a tightening mechanism (e.g., tightening with a lock nut and screw). For example, in some embodiments, a second screw is disposed on the front surface 223 of the second inner post 220 and extends forwardly through a second slot 216 disposed on the front surface 213 of the second outer post 210. As the second inner post 220 slides in and out of the second outer post 210, the second screw slides up and down within the second slot 216. A second lock nut 228 may be attached to the second screw (external to the second outer post 210). When the second inner post 220 is in a position of the user's choosing, he/she can turn the second lock nut 228 to tighten the connection between the second inner post 220 and the second outer post 210.

The first end of the first support arm and the first end of the second support arm (e.g., the first end 111 of the first outer post 110 and the first end 211 of the second outer post 210) are pivotally attached via a pivot component 142. In some embodiments, the pivot component 142 is a hinge or a pivot screw. The pivot component 142 allows the first support arm and the second support arm to move closer together or farther away from each other, creating an angle θ (see FIG. 4). The angle θ can vary.

The engine pulley testing device 100 of the present invention further comprises an arc-shaped brace component 300 for securing the first support arm and the second support arm a particular distance away from each other (e.g., a particular angle θ). The arc-shaped brace component has a first end 301, a second end 302, and a third slot 303 disposed therein. In some embodiments, the slot 303 extends from at or near the first end 301 to at or near the second end 302. In some embodiments, the third slot 303 extends from the front surface of the brace component 300 all the way through to the back surface of the brace component.

The arc-shaped brace component 300 is slidably attached to the back surface of the first support arm (e.g., first outer post 110) and to the back surface of the second support arm (e.g., second outer post 210). For example, in some embodiments, a third screw is disposed on the back surface of the first support arm (e.g., first outer post 110) and extends through the third slot 303 in the brace component 300. In some embodiments, a fourth screw is disposed on the back surface of the second support arm (e.g., second outer post 210) and extends through the third slot 303 in the brace component. The brace component 300 can be secured in a particular position via a third locking means. In some embodiments, the third locking mechanism is a tightening mechanism (e.g., tightening with a lock nut). For example, a third lock nut 323 is attached to the third screw (external to the brace component 300) and a fourth lock nut 324 is attached to the fourth screw. When the first support arm and second support arm are in a particular position of the user's choosing, he/she can turn the third lock nut 323 to tighten the connection between the brace component 300 and the first support arm and turn the fourth lock nut 324 to tighten the connection between the brace component 300 and the second support arm.

In some embodiments, the engine pulley testing device 100 of the present invention further comprises a third support arm 130. The third support arm 130 may help to increase the stability of the device 100 or to help secure the device 100 in place when it is in use. In some embodiments, the first end 131 of the third support arm 130 is attached to the support brace 300 and the second end 132 of the third support arm 130 extends upwardly past the pivot component 142 and connects to the first end of a pulley pole 410. The pulley pole 410 is generally perpendicular to the third support arm and extends forwardly past the first support arm and second support arm. Attached to the second end of the pulley pole 410 is a top pulley 530. In some embodiments, the top pulley 530 can rotate about the pulley pole 410. In some embodiments, the top pulley 530 can rotate with the pulley pole 410 (e.g., rotating the pulley pole 410 rotates the top pulley 530).

A first bottom pulley 510 is rotatably attached to the first support arm near the second end (e.g., to the front surface 123 of the first inner post 120). A second bottom pulley 520 is rotatably attached to the second support arm near the second end (e.g., to front surface 223 of the second inner post 220). An engine belt 560 can be wrapped around the first bottom pulley 510, the second bottom pulley 520, and/or the top pulley 530. The engine belt 560 can be further wrapped around a test pulley 580 being tested in the engine (see FIG. 6, FIG. 7).

In some embodiments, a power motor component 440 is disposed on the second end 132 of the third support arm 130 (e.g., opposite the pulley pole 410). The power motor component 440 can drive the rotation of the pulley pole 410 and the top pulley 530. The power motor component 440 is operatively connected to a power source (e.g., an electrical outlet, a battery). In some embodiments, the power motor component 440 is operatively connected to an electrical outlet via a plug 445.

Figure 1:
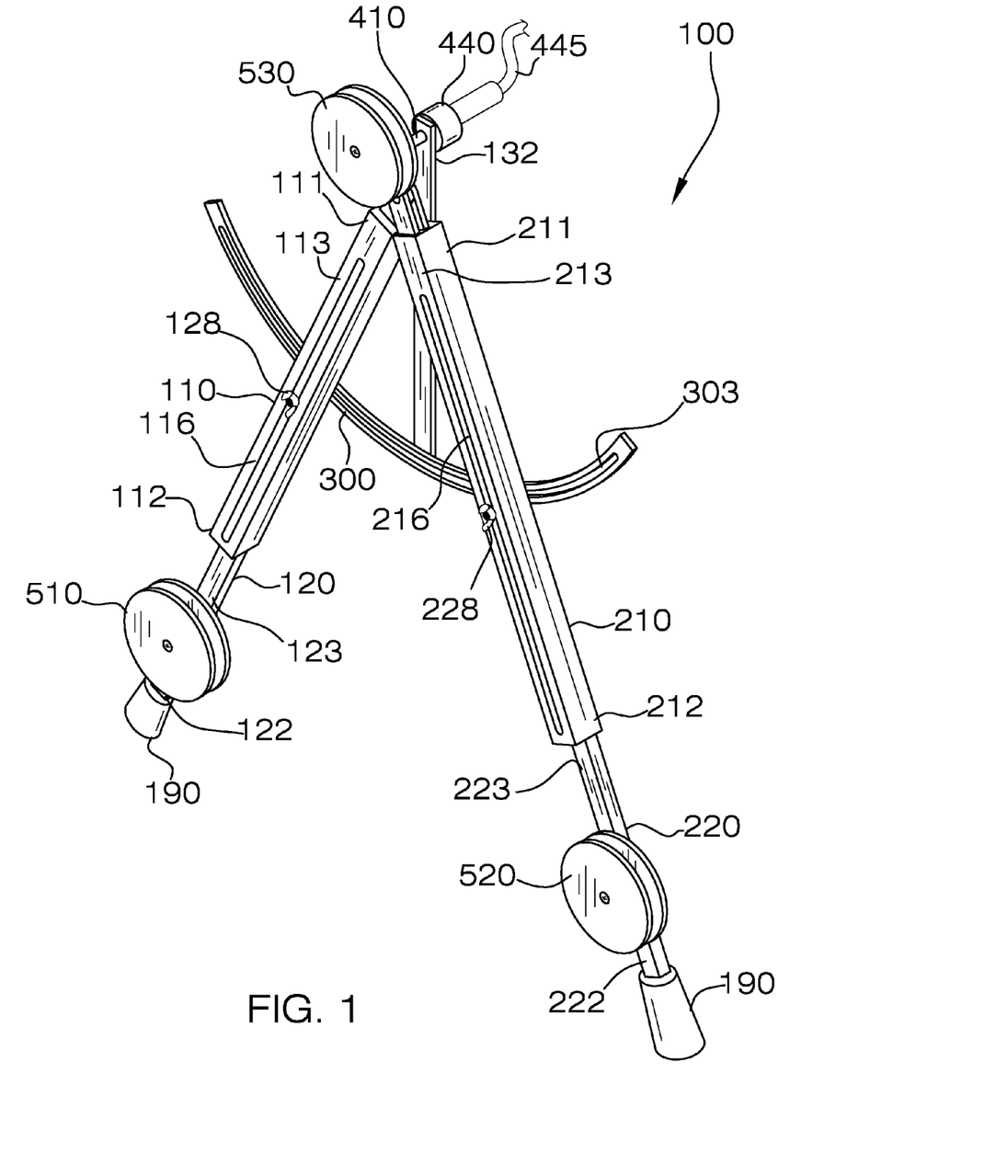
FIG. 1 is a perspective view of the engine pulley testing device of the present invention.
Figure 2:
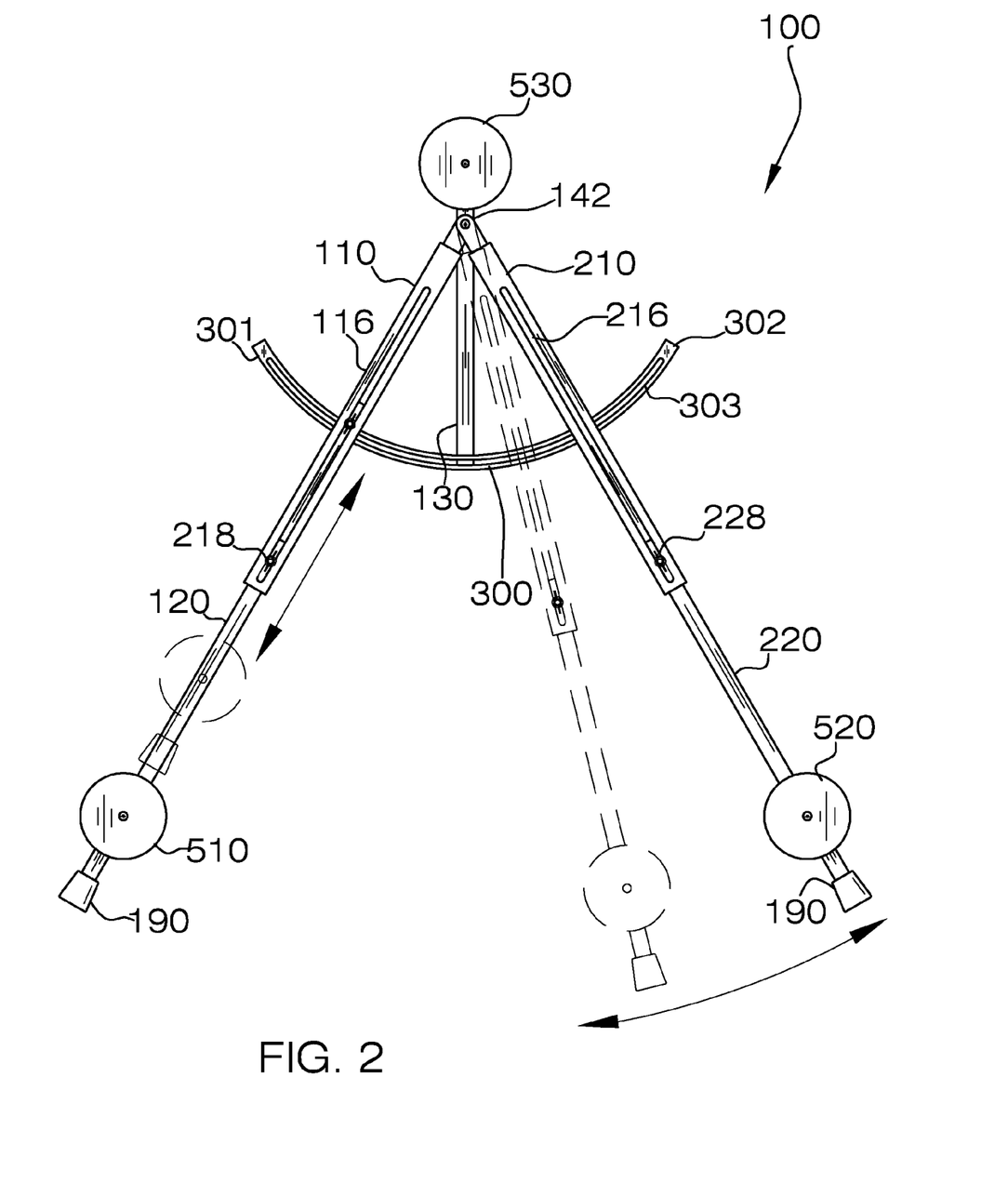
FIG. 2 is a front view of the engine pulley testing device of the present invention.
Figure 3:
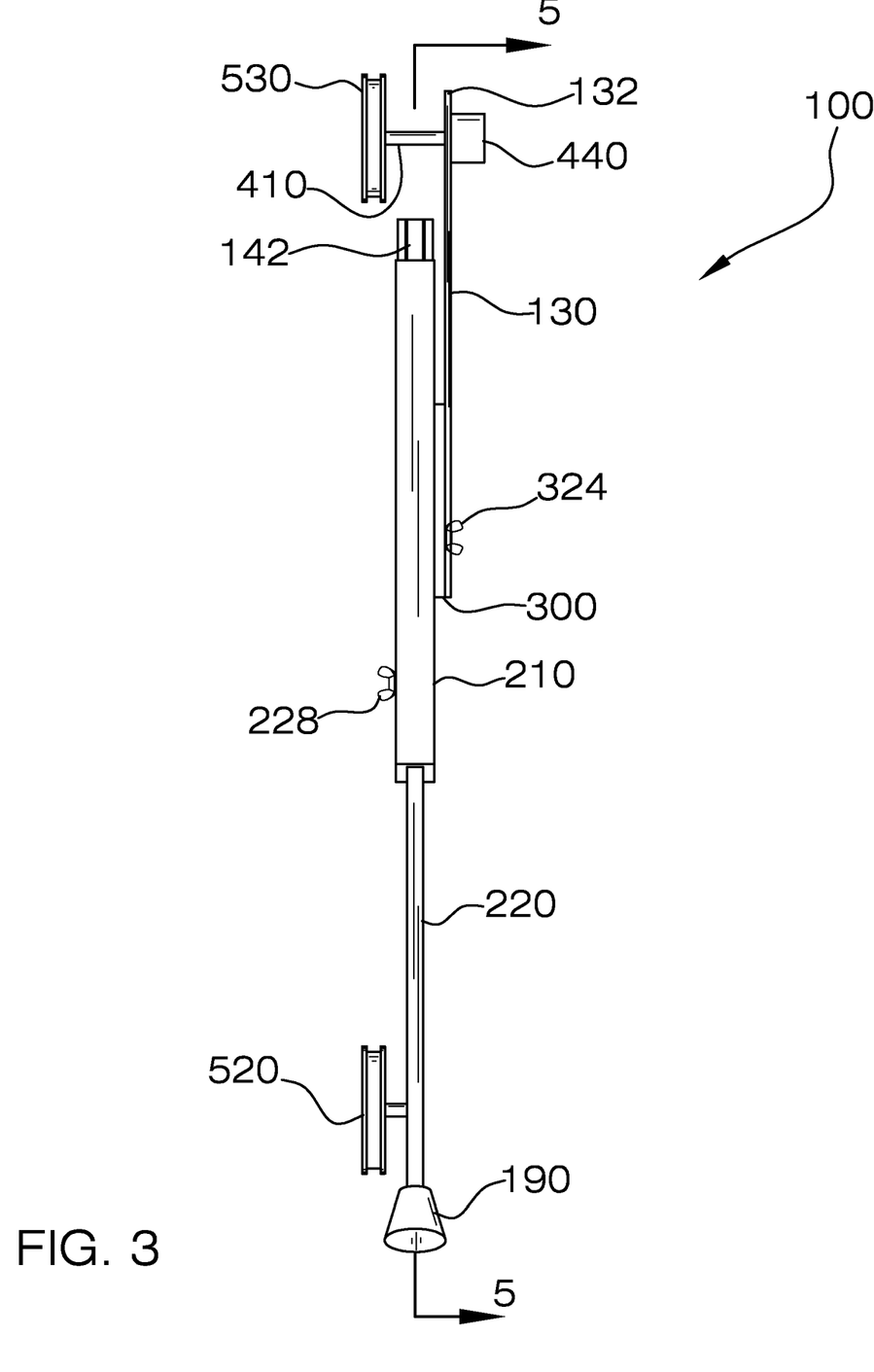
FIG. 3 is a side view of the engine pulley testing device of the present invention.
Figure 4:
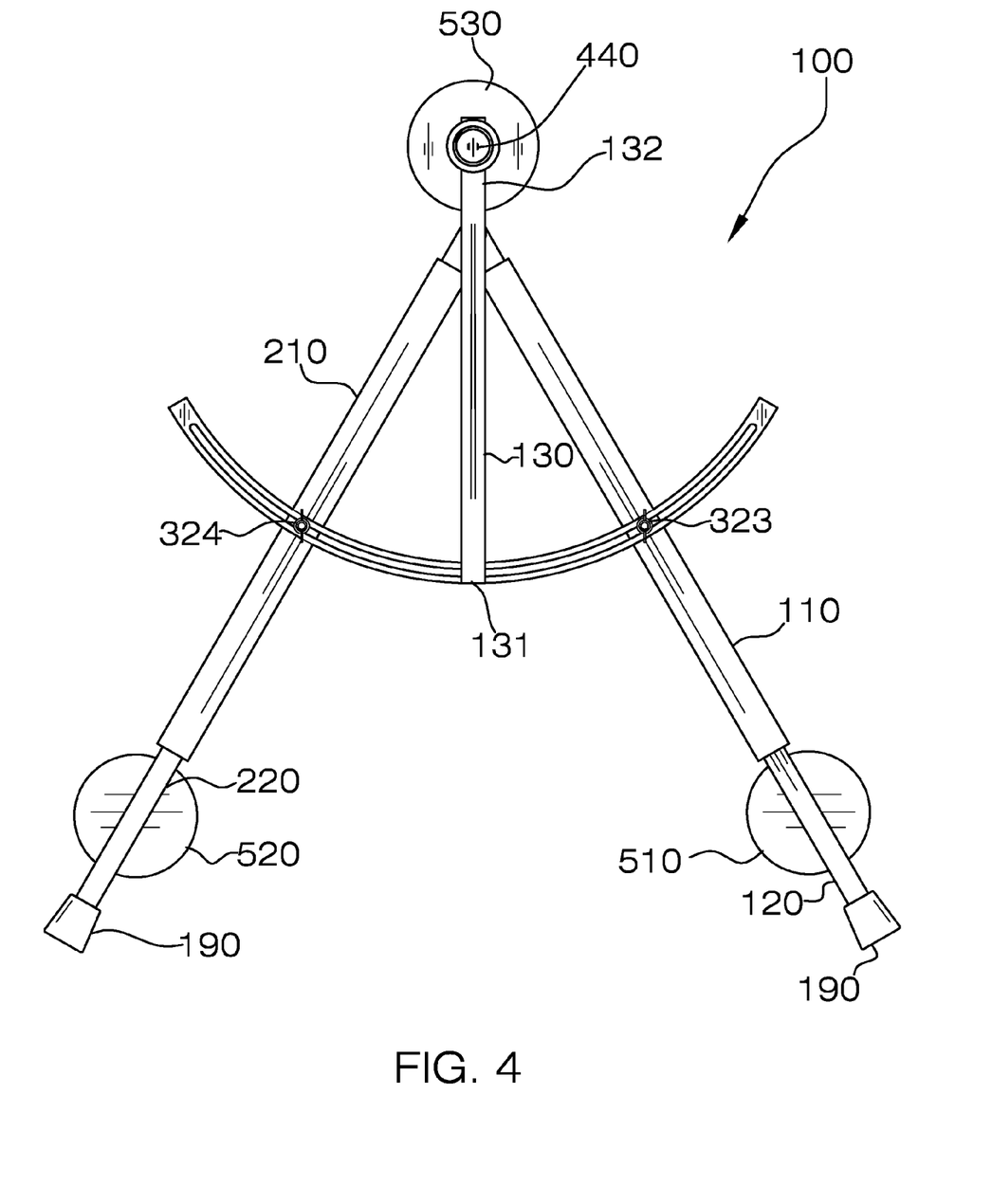
FIG. 4 is a back view of the engine pulley testing device of the present invention.
Figure 5:
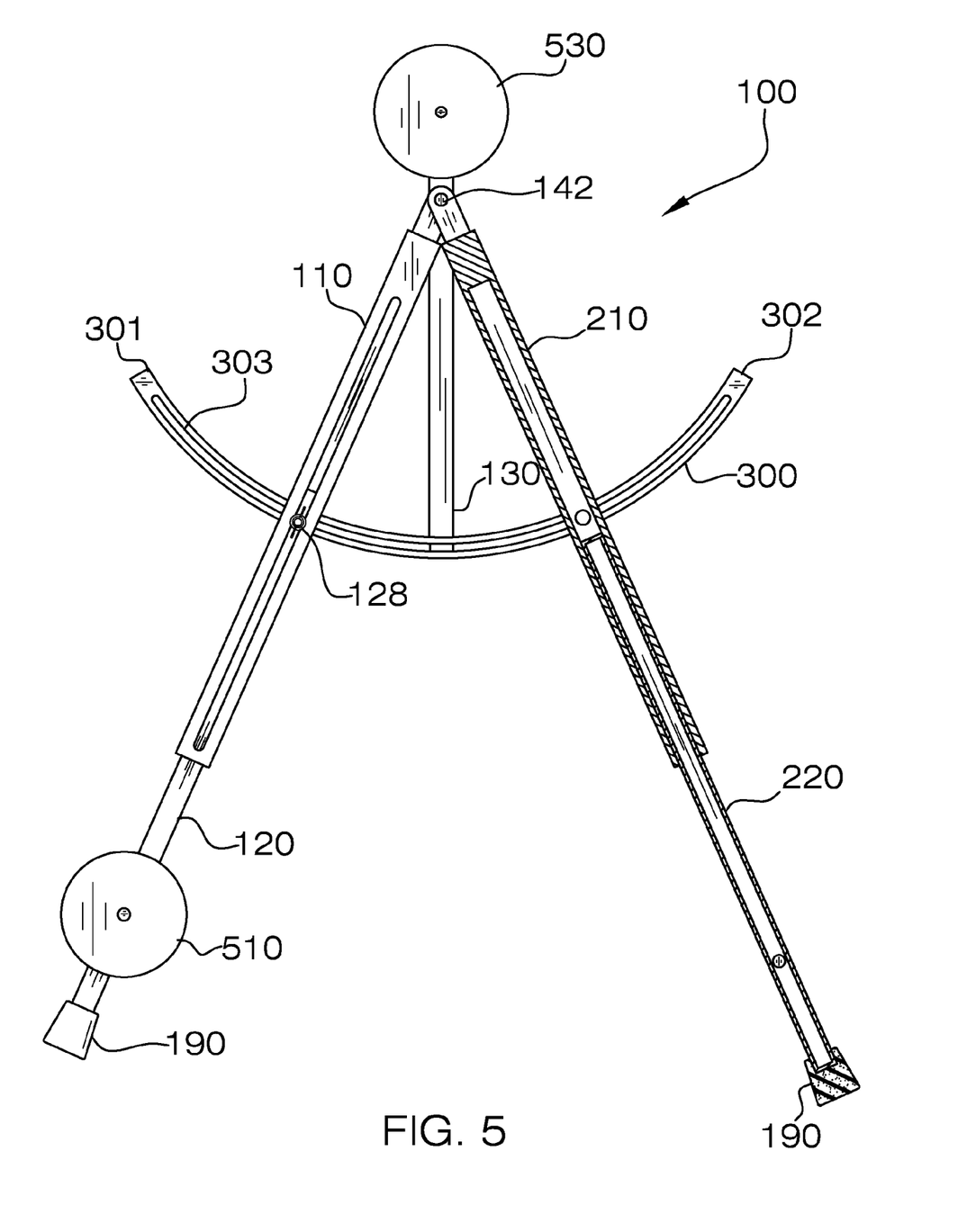
FIG. 5 is a front and cross sectional view of the engine pulley testing device of the present invention.
Figure 6:
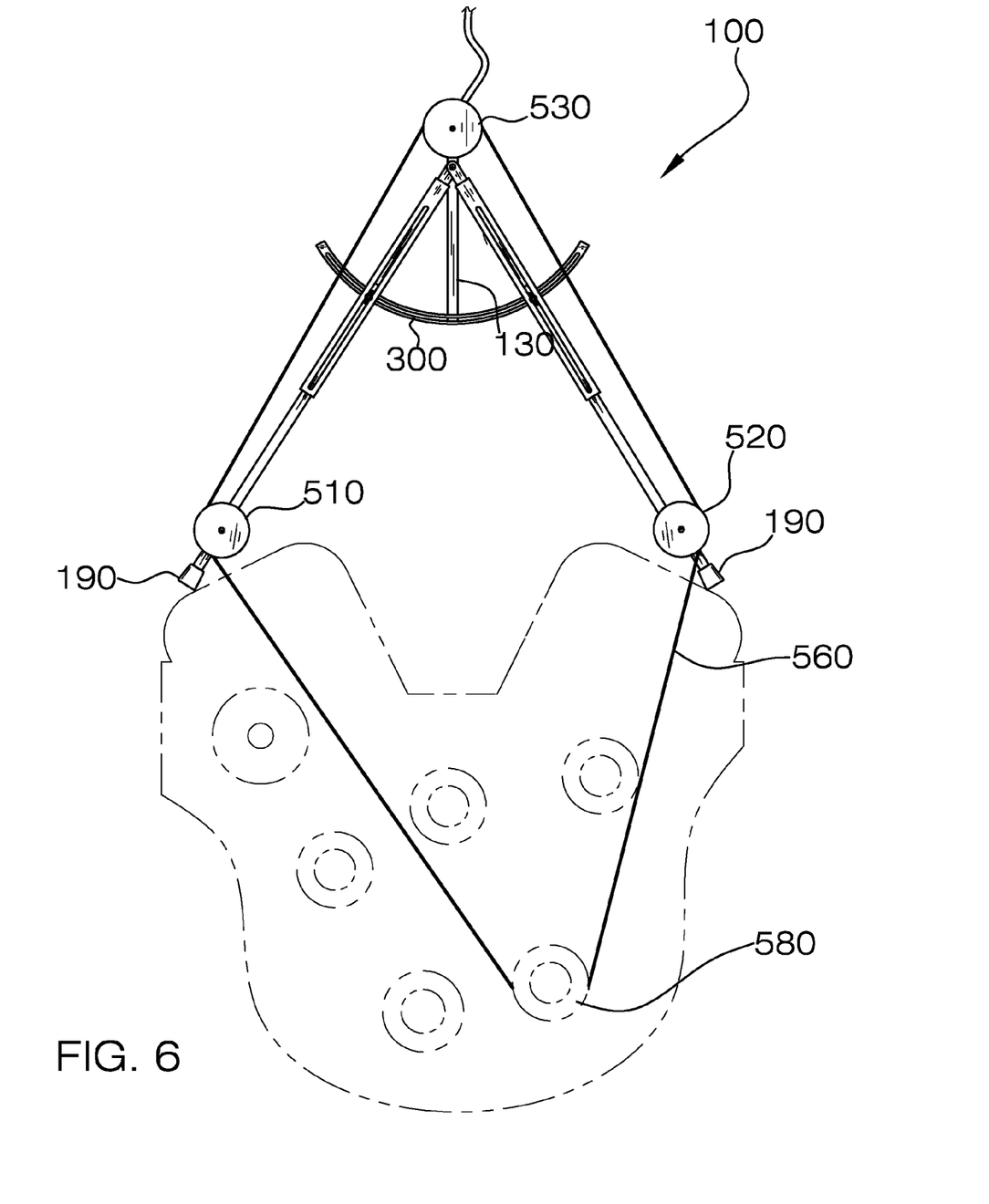
FIG. 6 is a front view of the engine pulley testing device of the present invention as used on engine pulleys.
Figure 7:
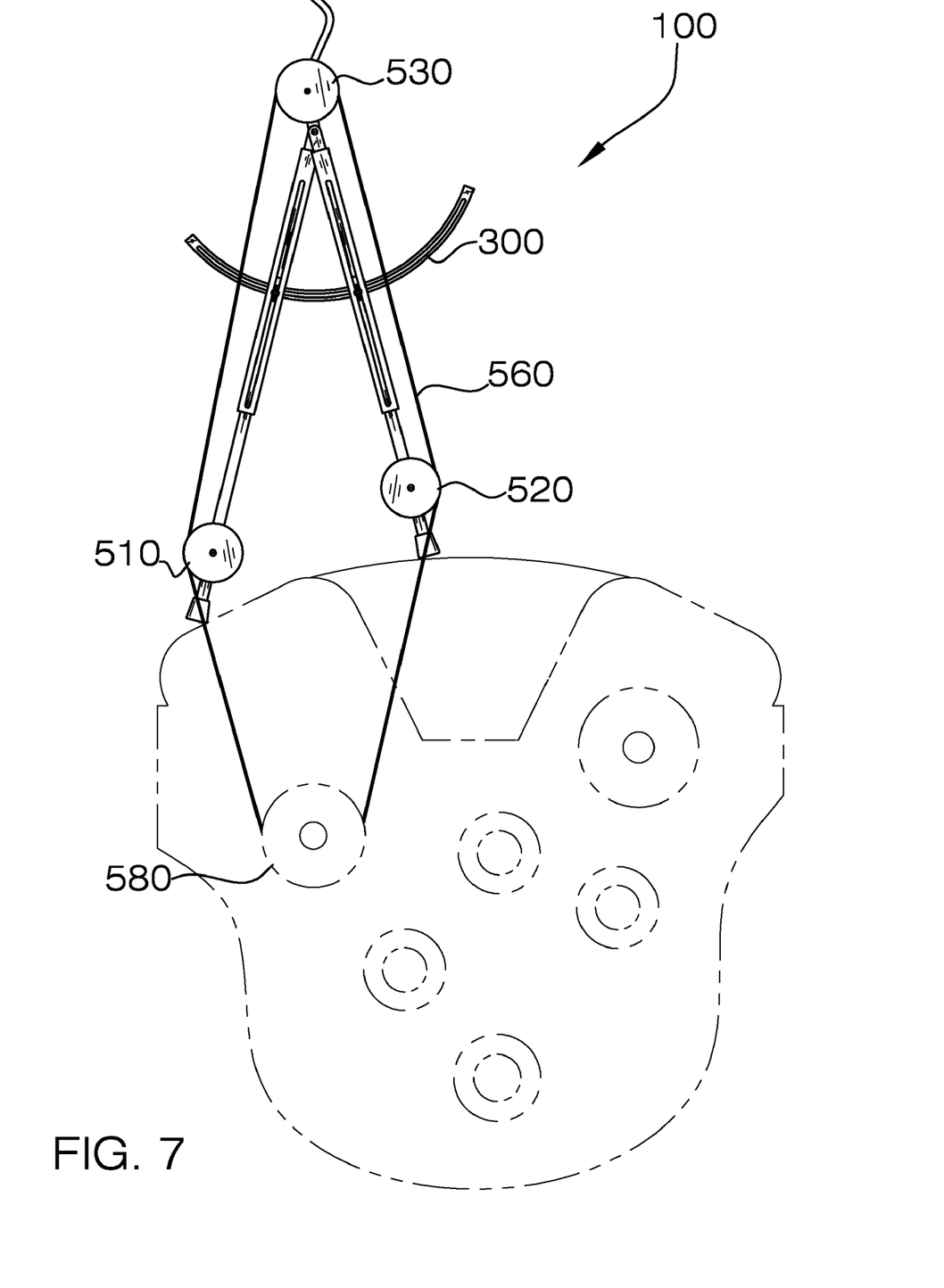
FIG. 7 is a front view of the engine pulley testing device of the present invention as used on engine pulleys.

To use the device, a user may place the engine pulley testing device 100 atop the front of an engine. He/she can adjust the support legs and brace 300 as necessary and connect the engine belt 560 to a test pulley 580 in the engine as well as to the top pulley 530 (and the first bottom pulley 510 and second bottom pulley 520). Testing of the pulleys may then begin. Testing pulleys is well known to one of ordinary skill in the art. For example, in some embodiments, the power motor component 440 may be activated to spin the top pulley 530, which causes the engine belt 560 to spin. In some embodiments, the user can listen and/or feel for damage such as a worn pulley or pulley bearings.

In some embodiments, a gripping component 190 is disposed on the second end 122 of the first inner post 120 and on the second end 222 of the second inner post 220. The gripping component 190 can help stabilize the engine pulley testing device when it is in use (e.g., placed atop an engine), for example the gripping component 190 may help to prevent the device 100 from slipping.

The disclosures of the following U.S. Patents are incorporated in their entirety by reference herein: U.S. Pat. No. 4,235,091; U.S. Pat. No. 5,780,731; U.S. Pat. No. 6,301,978 B1; U.S. Pat. No. 7,246,015 B2; U.S. Pat. No. 3,832,899; U.S. Pat. No. 5,336,993; U.S. Pat. No. 4,480,487; U.S. Pat. No. 5,701,089.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An engine pulley testing device for testing a test pulley in an engine, said engine pulley testing device comprising:
   (a) an adjustable first support arm and an adjustable second support arm, wherein a first end of the first support arm is pivotally attached to a first end of the second support arm via a pivot component;
   (c) an arc-shaped brace component for securing the first support arm and the second support arm a particular distance apart, wherein the brace component has a first end, a second end, and a third slot disposed therein, wherein the third slot extends from near the first end of the brace component to near the second end of the brace component and from a front surface of the brace component through to a back surface of the brace component;
   wherein the brace component is slidably attached to a back surface of the first support arm via a third screw disposed on the first support arm and extending through the third slot, wherein the brace component is slidably attached to a back surface of the second support arm via a fourth screw disposed on the second support arm and extending through the third slot, wherein the brace component can be locked to the first support arm and to the second support arm via a third locking means;
   (d) a third support arm having a first end and a second end, the first end being attached to the support brace and the second end extending upwardly past the pivot component, wherein a pulley pole is perpendicularly attached to the second end of the third support arm; and
   (e) a top pulley attached to the pulley pole, a first bottom pulley rotatably attached to a front surface of the first support arm, and a second bottom pulley rotatably attached to a front surface of the second support arm;
   wherein an engine belt can be wrapped around the first bottom pulley, the second bottom pulley, the top pulley, and the test pulley being tested in the engine.

2. The engine pulley testing device of claim 1, wherein the adjustable first support arm comprises a first inner post telescopically received in a first outer post, wherein the first inner post can be locked in the first outer post via a first locking mechanism.

3. The engine pulley testing device of claim 1, wherein the adjustable second support arm comprises a second inner post telescopically received in a second outer post, wherein the second inner post can be locked in the second outer post via a second locking mechanism.

4. The engine pulley testing device of claim 2, wherein the first locking mechanism comprises a first screw disposed on a front surface of the first inner post and extending forwardly through a first slot disposed on a front surface of the first outer post; and a first lock nut attached to the first screw externally to the first outer post, wherein the first lock nut can be turned to lock the first inner post to the first outer post.

5. The engine pulley testing device of claim 3, wherein the second locking mechanism comprises a second screw disposed on a front surface of the second inner post and extending forwardly through a second slot disposed on a front surface of the second outer post; and a second lock nut attached to the second screw externally to the first outer post, wherein the second lock nut can be turned to lock the second inner post to the second outer post.

6. The engine pulley testing device of claim 1, wherein the pivot component is a hinge or a pivot screw.

7. The engine pulley testing device of claim 1, wherein a power motor component is disposed on a second end of the third support arm for rotating the pulley pole and top pulley.

8. The engine pulley testing device of claim 7, wherein the power motor component is operatively connected to a power source.

9. The engine pulley testing device of claim 1 further comprising a gripping component disposed on a second end of the first inner post and on a second end of the second inner post to help stabilize the engine pulley testing device when in use.

* * * * *